United States Patent [19]

Kundikoff

[11] Patent Number: 4,750,270
[45] Date of Patent: Jun. 14, 1988

[54] MEASURING RULER

[76] Inventor: Peter Kundikoff, Rte. 1, Box 204, Escondido, Calif. 92025

[21] Appl. No.: 64,528

[22] Filed: Jun. 22, 1987

[51] Int. Cl.$^4$ .............................................. G01B 3/04
[52] U.S. Cl. .................................... 33/494; 33/137 R
[58] Field of Search ..................... 33/137 R, 483, 492, 33/494

[56] References Cited

U.S. PATENT DOCUMENTS

| | | | |
|---|---|---|---|
| 1,687,429 | 10/1928 | Datson | 33/494 |
| 3,202,129 | 8/1965 | Weldon | 33/494 |
| 3,399,459 | 9/1968 | Martin | 33/494 |
| 3,787,982 | 1/1974 | Anderson | 33/494 |
| 4,247,986 | 2/1981 | Burroughs | 33/494 |

FOREIGN PATENT DOCUMENTS

| | | | |
|---|---|---|---|
| 170006 | 1/1952 | Austria | 33/494 |
| 516524 | 1/1953 | Belgium | 33/494 |
| 837320 | 4/1952 | Fed. Rep. of Germany | 33/137 R |
| 753009 | 10/1933 | France | 33/494 |
| 12395 | 6/1894 | United Kingdom | 33/494 |

Primary Examiner—William A. Cuchlinski, Jr.
Assistant Examiner—Patrick R. Scanlon
Attorney, Agent, or Firm—John J. Murphy

[57] ABSTRACT

A measuring ruler, having a straight edge and a set of subunit measuring indicia adjacent the edge, wherein the indicia comprise a series of first and second measuring marks of equal width, in side-by-side alternating arrangement, normal to the edge, wherein the color of the first marks is in stark visual contrast to the color of the second marks.

2 Claims, 1 Drawing Sheet

MEASURING RULER

BACKGROUND OF THE INVENTION

1. Field of the Invention

This invention relates to the field of measuring devices. More particularly, this invention relates to the field of measuring devices such as measuring rulers especially adapted to measuring small distances for instance, distances on the order of one-hundredth of an inch.

2. Background of the Invention

The need to accurately measure distances between various points has been with man's civilization from the very beginning. Society as a whole and particularly art and science is based in large part upon the knowledge of distance. For accuracy, elongated strips of materials having a straight measuring edge have been used to measure these distances where indicia of measured units are imparted along the straight edge to permit the strip, called a measuring ruler or tape, to be held spanning between the measured points and direct visual reading taken place of the distance therebetween. The strips may be flexible or inflexible; some of the flexible strips may be windable on a reel. Some of the materials usable for the strips are wood, plastic, steel and plastic-coated cloth. The indicia may be imparted by printing, chemical etching, stamping, silkscreening and photoengraving.

In whatever culture one looks, one can percieve a unit of measure, such as the yard for English-speaking countries and the meter for others. Both of these units have been subdivided into very small units, inches and its subcomponents (hundredths and thousandths of an inch) and centimeters and its subcomponents (millimeters and decimal parts thereof). In each of these cases, the measuring ruler is used more often than any other device.

In the general makeup of measuring rulers, a unit, for instance an inch, is subdivided into a number of subunits representing a division of the unit, for instance one-half, one-quarter, one-eighth, one-sixteenth and so on. The space between the one-inch units represented by these particular subunits are visually observed by locating the distance to be measured on the straight edge, having one distance measuring point set at zero on the scale and thereafter counting the number of subdivisions between the zero reference on the scale and the other point and reading directly therefrom the distance in units and subunits. In general, the distance between the unit of measure on the scale is subdivided by straight narrow lines, normal or perpendicular to the straight measuring edge, and one visually observes and mentally counts the number of subdivisions between the points to be measured.

When measuring distances between measured indicia on a small sclae, it is difficult to visually and mentally coordinate the number of spaces between the points to be measured because of the plurality of dividing lines that interrupt the spaces that make up the subunits. Further, closely spaced measuring indicia are just hard to count because of their plurality and closeness. Even where the length of the indicia lines have been altered to show groupings of subdivisions, such as for 1/16th lines being grouped by end lines showing a quarter-inch, it is difficult to count the closely spaced dividing lines. Finally, the conventional division of an inch on a measuring rule is difficult to read down to one-hundredths of an inch because of the width and interruption of the lines separating the distances therebetween.

The prior art has made many attempts to facilitate measurements on scales where these sort of problems have arisen, see U.S. Pat. Nos. 289,512; 861,799; 1,687,429; 3,202,129; 4,247,986 and United Kingdom Pat. No. 12,395. While these prior art attempts have produced some readability in some scale measurements, none have been able to completely satisfy all of the aforesaid problems.

SUMMARY OF THE INVENTION

This invention is a measuring device that overcomes the aforesaid problems in the prior art. The invention comprises a measuring ruler having a straight measuring edge and a novel set of subunit measuring indicia adjacent the edge, for use in measuring the parts of the unit of measure, where the indicia comprise a series of first and second measuring marks of equal width, in side-by-side alternating arrangement, normal or perpendicular to said edge, wherein the color of the first marks is in stark visual contrast to the color of the second marks. The division lines between the subunits making up the measuring ruler have been eliminated in this invention and the lines themselves become a subunit of measure. The preferred color constrast between the marks is black and white, however, other starkly contrasting color combinations are fully contemplated. The subunits are grouped and marked with a series of equally spaced integers between the measuring units and some of the first and second measuring marks between the integers are joined interior of the measuring edge into a novel pointed configuration for ease in locating the appropriate measuring indicia.

This invention solves the aforesaid problems in the prior art by eliminating the separating lines between the measuring subunits along the ruler and make lines and spaces equal in measuring subunits. The total number of marks between any unit of measure along the edge of the measuring ruler is thereby reduced by 50%. The easy-to-read pointed configurations between the subunit integers provide ease in locating and counting the respective measuring units. Finally, there is eliminated, for the most part, the need to interpolate between measurings because of the fact that the scale may be further subdivided into easy-to-read smaller units that fully come within the scope of this invention.

Accordingly, it is a main object of this invention to provide a unique measuring ruler having a less cluttered and more easy-to-read set of measuring indicia spaced along the measuring edge of the ruler. Further objects of the invention are a ruler with a reduced number of measuring indices along the measuring edge without a concomitant decrease in the number of available subunits for use in measuring; a measuring ruler having evenly spaced indicia grouped in easy-to-read brackets between integers representing nominal subunits within the measuring unit itself, and a means of dividing the standard English inch into an easy-to-read and easy-to-handle number of subunits that is conveniently adapted to be compatible with the English inch and the metric system. These and other objects of the invention will appear more fully when reading the description of the preferred embodiment coupled with the drawings attached hereto. The scope of protection sought by the inventor may be gained from a fair reading of the claims that conclude this specification.

DESCRIPTION OF THE PREFERRED EMBODIMENT

Figure 1:
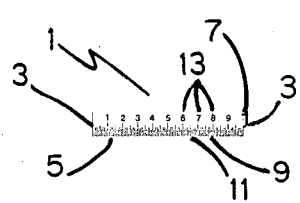
FIG. 1 is a top plan view of a typical one-inch measuring unit of the prior art divided into 100 subparts.

In the figures, where like elements are identified by like numerals throughout the five figures, FIG. 1 shows a typical one-inch measuring unit 1, as would generally appear on a ruler, said unit 1 terminated at spaced-apart unit borders 3, shown as spaced-apart parallel lines normal to a straight measuring edge 5. Unit locators 7, shown as the integer "1" adjacent right border 3, is located adjacent until border 3 to indicate the cumulative number of units between the beginning border, located at the left end of unit 1 (usually identified by the integer "0" however it is missing here) and the point to be measured.

Each unit 1 is subdivided into measurable subunits 9 by a series of spaced-apart, parallel subunit borders or lines 11 that are normal to edge 5. Adjacent certain of lines 11 and spaced inward from edge 5 are subunit locators 13 that are integers indicating the cumulative number of subunits between borders 3 of each unit.

It should be noted that, in the prior art example of FIG. 1, white or light-colored subunits 9 are the distance-measuring indicia, not black line subunit borders 11. The lines and spaces are shown crowded together, thus making reading of specific distances difficult. As subdividing proceeds to smaller and smaller subunits, the width of borders or lines 11 becomes a greater impediment to the accuracy of subunits 9. It appears that the total width of the lines themselves starts to represent a significant amount of distance in measuring unit 1.

A set of measuring indicia or closely spaced black lines 7 is placed by printing, chemical etching or other depositary technique adjacent edge 5 for subdividing the one-inch distance therealong. A set 7 contains unit locator symbols 9 that provide indications of unit distances along the edge 5 and may begin at any number, generally "0" or "1, and either increase or decrease by one integer or one letter in the case of alphabet or other indicia, as one proceeds along edge 5.

Figure 2:
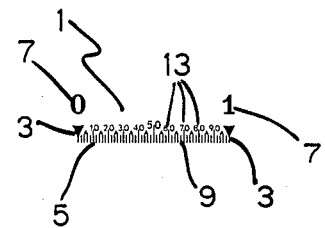
FIG. 2 is a top plan view of a one-inch measuring unit embracing my invention divided into the same number of subparts.
Figure 3:
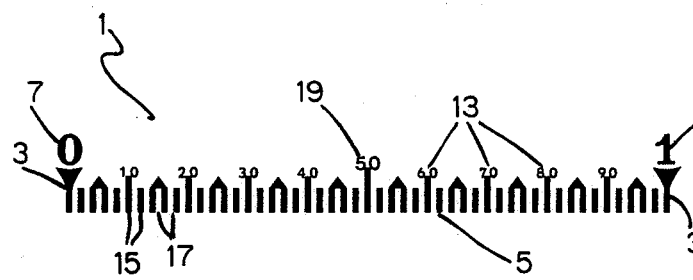
FIG. 3 is an enlarged plan view of the measuring unit shown in FIG. 2.
Figure 4:
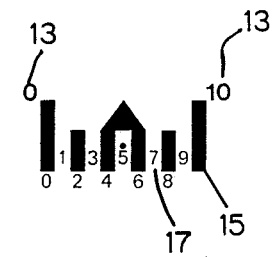
FIG. 4 is an enlarged plan view of a subdivided portion of the unit shown in FIG. 3; and, FIG. 5 is a top plan view of a measuring ruler embracing my new invention.
Figure 5:
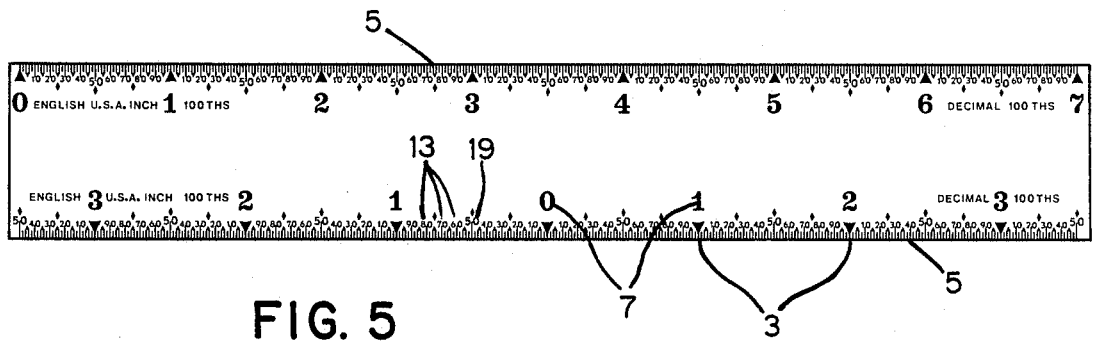

FIGS. 2, 3 and 4 show my invention on an expanded scale while FIG. 5 shows a whole measuring ruler embracing my invention. I have eliminated subunit borders 11 and have replaced the whole scale with a series of first and second measuring marks 15 and 17, respectively, all of the marks having the same width. Marks 15 and 17 are placed in side-by-side alternating arrangement, normal or perpendicular to measuring edge 5. They are also arranged to be somewhat elongated so that their length inward from edge 5 is longer than their width along edge 5. As shown in FIG. 4, their axes of elongation, x-x in first mark 13 and y-y in second mark 15, are mutually parallel.

Further, important in this invention is the fact that the color of first marks 15 and the color of second marks 17 are made in stark visual contrast. For example, shown in the figures is a stark visual contrast of black and white. Other stark visual contrasting color combinations such as yellow and blue, pink and black, red and white are also usable herein and fully contemplated within the scope and spirit of this invention. The background may be of different colors than either first marks 15 and/or second marks 17; shown in the drawings, the background is the same as that of second marks 17. FIG. 5 shows my invention used in a pocket-sized measuring ruler.

Because marks 15 and 17 are of equal width, there is no need for further dividing lines such as subunit borders 11 between the measured subunits. Accordingly, the number of lines visualized by one using this inventive scale is reduced by 50% over that of the prior art. As shown in FIG. 4, each mark makes up a measuring subunit; between subunit locators "0" and "10" the integers below first marks 15 and in second marks 17, both adjacent edge 5, indicate how one counts the subunits in using this invention. There may be some inaccuracy or deviation attendant with the deposition of marks 15 and 17 in side-by-side arrangement along edge 5 that is a part of the deposition process, however, even slight inaccuracies in these widths will build no more (and usually far less) of an inaccuracy in the total measurement operation than is occasioned by the use in the prior art with multiple dividing lines. Printing, photodeposition and chemical etching processes have accuracies to within 0.002 inches in one-inch ruler untis with 10/1000 inch-wide first and second marks and these are equal to or far better that the accuracies attendant the prior art. These accuracies are fully contemplated in this invention.

I provide the same subunit locators 13 in my invention as provided in the prior art except that mine are in units of 10 indicating units of 10/1000ths of an inch. As shown, subunit locators 13 are centerd a top first marks 15. This arrangement helps the user locate the proper number of subunits making up the measured units during the measuring operation. Further, the measuring unit, identified between unit borders 3 may be subdivided only generally such as shown by half-unit mark 19, dominated by the integer "50", indicating 50/100 or one-half of an inch.

First and second marks 15 and 17 that are between the integers do continue to present some difficulty in visual counting, especially when the unit locators 7 and subunit locators 13 denominate the one inch unit in the realistic view shown in FIG. 2. To aid the user in locating the appropriate marks between said locators, I have provided for joining the middle two first marks 15 and central second mark 17 therebetween interior of measuring edge 5 by a pointed configuration 21 shown FIGS. 2-5. Accordingly, the unit of measure is denominated by the unit locators 7, the half-unit mark is denoted by half-unit mark 19, the integers denote groupings of ten subunits throughout the measuring unit and pointed configurations 21 help the user locate the appropriate subunits during the measuring operation.

I claim:

1. A measuring inch ruler, having a straight measuring edge and a set of measuring indicia adjacent said edge, for use in measuring distances, wherein said indicia comprise a series of first and second measuring marks of equal widths, in side-by-side alternating arangement and normal to said edge, formed in one inch segments along said edge, each said inch segment further divided into one hundred equal sub-units in a pattern of fifty marks of one color alternating with fifty marks of another color, in stark visual contrast, wherein said alternating pattern further includes a series of integers from ten to ninety in increments of ten units interspaced at regular intervals between said one-inch segments opposite the appropriate location of one-tenth distances where, within said increments of ten units each, the middle three units are joined interior of said measuring edge into a pointed configuration for ease in locating the appropriate measuring indicia.

2. The measuring inch ruler of claim 1 wherein the colors of said first and second marks are black and white respectively.

* * * * *